US012705715B2

(12) United States Patent
Kornienko et al.

(10) Patent No.: US 12,705,715 B2
(45) Date of Patent: Aug. 11, 2026

(54) TONE MAPPING FOR PRESERVING CONTRAST OF FINE FEATURES IN AN IMAGE

(71) Applicant: Apple Inc., Cupertino, CA (US)

(72) Inventors: Alexey Kornienko, Watford (GB); Mahesh B Chappalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 682 days.

(21) Appl. No.: 18/101,957

(22) Filed: Jan. 26, 2023

(65) Prior Publication Data

US 2024/0078648 A1 Mar. 7, 2024

Related U.S. Application Data

(60) Provisional application No. 63/404,093, filed on Sep. 6, 2022.

(51) Int. Cl.

| | |
|---|---|
| ***G06T 5/92*** | (2024.01) |
| ***G06T 5/20*** | (2006.01) |
| ***G06T 5/40*** | (2006.01) |
| ***G06V 10/60*** | (2022.01) |
| ***G06V 10/75*** | (2022.01) |

(52) U.S. Cl.

CPC .................. *G06T 5/92* (2024.01); *G06T 5/20* (2013.01); *G06T 5/40* (2013.01); *G06V 10/60* (2022.01); *G06V 10/751* (2022.01); *G06V 10/758* (2022.01)

(58) Field of Classification Search

CPC .... G06T 5/92; G06T 5/20; G06T 5/40; G06V 10/60; G06V 10/751; G06V 10/758

See application file for complete search history.

(56) References Cited

U.S. PATENT DOCUMENTS

| | | | | |
|---|---|---|---|---|
| 5,594,807 A * | 1/1997 | Liu | ........................... | G06T 5/94 382/128 |
| 11,277,646 B2 * | 3/2022 | Song | ...................... | H04N 19/86 |
| 11,395,009 B2 * | 7/2022 | Yin | ........................ | H04N 19/46 |

(Continued)

FOREIGN PATENT DOCUMENTS

| | | | | |
|---|---|---|---|---|
| EP | 3203442 A1 * | 8/2017 | ............... | G06T 7/11 |
| WO | WO 201916-986 * | 8/2019 | | |
| WO | WO-2019160986 A1 * | 8/2019 | ........... | H04N 19/176 |

*Primary Examiner* — Molly Wilburn
*Assistant Examiner* — Jordan Mckenzie Elliott
(74) *Attorney, Agent, or Firm* — Fletcher Yoder, P.C.

(57) ABSTRACT

This disclosure is directed towards tone mapping systems and methods that preserve contrast of fine features of an image and avoid brightening monotonic regions of the image. To preserve contrast and avoiding brightening of the monotonic regions, an image processing circuitry may include hardware that enables determining pixel statistics of an image, generating a tone mapping that is configured to adjust the color values of pixels in the image, and applying the tone mapping to at least the low frequency component of the image to produce an output image where the contrast of the fine details is preserved. In addition, the image processing circuitry may include hardware that enables adjusting the tone mapping based on variance bins in a histogram of pixel values and applying the adjusted tone mapping to produce an output image where the monotonic regions are not brightened.

13 Claims, 11 Drawing Sheets

(56) References Cited

U.S. PATENT DOCUMENTS

| | | | | |
|---|---|---|---|---|
| 2005/0248687 | A1* | 11/2005 | Lee | G06T 5/73 345/581 |
| 2008/0266413 | A1* | 10/2008 | Cohen | H04N 23/843 348/222.1 |
| 2009/0109232 | A1* | 4/2009 | Kerofsky | G09G 3/3406 345/589 |
| 2009/0167672 | A1* | 7/2009 | Kerofsky | G09G 3/3413 382/168 |
| 2010/0080459 | A1* | 4/2010 | Dai | G06T 5/40 382/170 |
| 2015/0078661 | A1* | 3/2015 | Granados | G06T 5/92 382/167 |
| 2017/0264839 | A1* | 9/2017 | Uvarov | G06T 5/92 |
| 2017/0308996 | A1* | 10/2017 | Kadu | G06T 5/70 |
| 2021/0241055 | A1* | 8/2021 | Miyazaki | H04N 1/6027 |
| 2021/0241056 | A1* | 8/2021 | Miyazaki | G06K 15/1872 |
| 2021/0272251 | A1* | 9/2021 | Unger | G06T 5/92 |
| 2023/0114798 | A1* | 4/2023 | Nossek | G06T 5/70 382/100 |
| 2023/0117976 | A1* | 4/2023 | Woodall | G06T 5/20 382/168 |

* cited by examiner

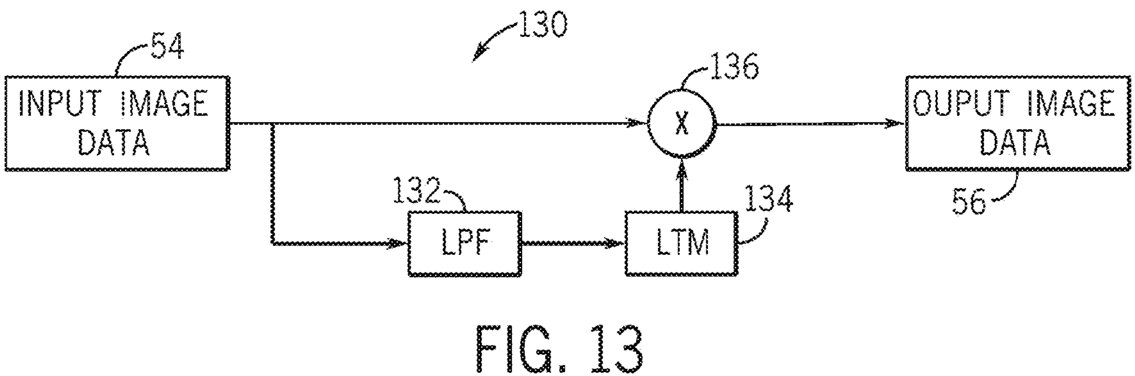
FIG. 13
FIG. 14
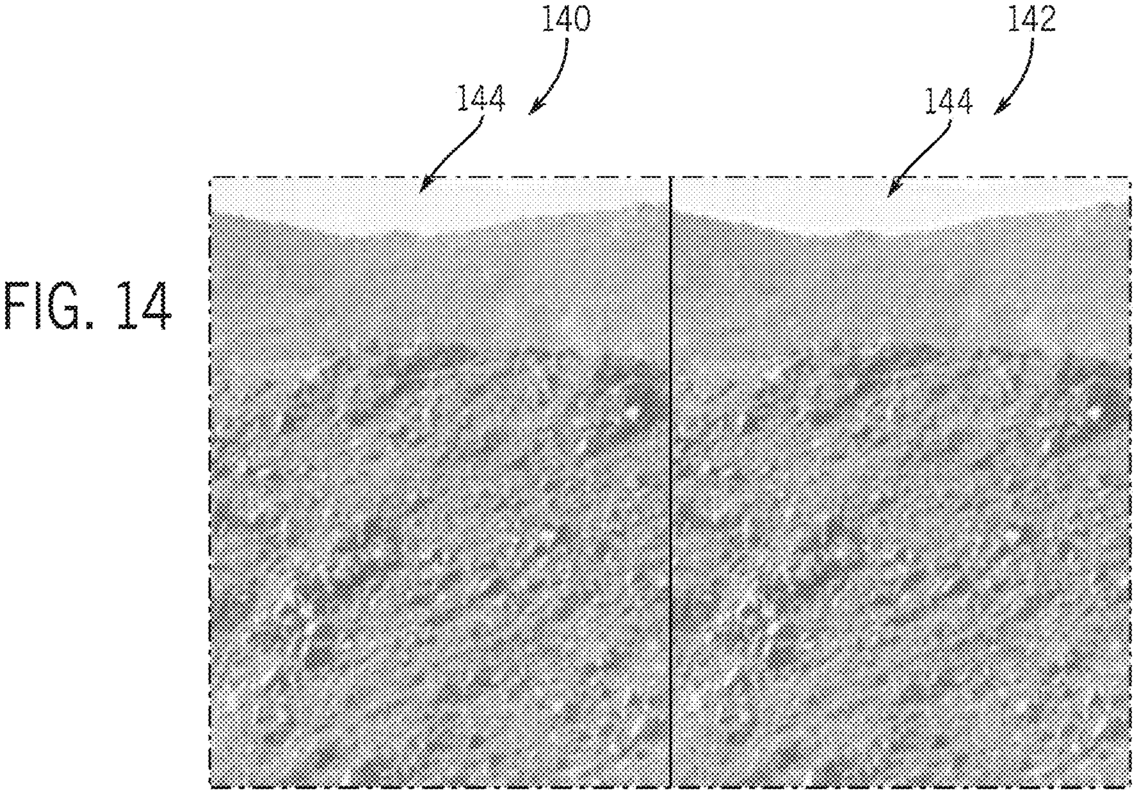

TONE MAPPING FOR PRESERVING CONTRAST OF FINE FEATURES IN AN IMAGE

CROSS-REFERENCE TO RELATED APPLICATIONS

This application claims priority to U.S. Provisional Application No. 63/404,093, entitled "Tone Mapping for Preserving Contrast of Fine Features in an Image," filed Sep. 6, 2022, the disclosure of which is incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and video by displaying image frames of image data on the electronic display. For example, such electronic devices may include computers, mobile phones, portable media devices, tablets, televisions, virtual-reality headsets, and vehicle dashboards, among many others. To display an image, an electronic display may control light emission of its display pixels based on corresponding image data. Generally, the range of luminance of the display pixels may affect perceived contrast, which may be understood as the brightness difference between display pixels in an image. In fact, increasing the contrast by altering luminance values of pixels in an image may improve image sharpness and, thus, the perceived image quality.

Tone mapping may be used to change luminance values of pixels in an image and to provide both improved contrast as well as reduce power consumption by a backlight of a display. Tone mapping includes using a tone mapping curve to map values of pixels in an original image to different values of corresponding pixels of an output image. However, depending on the content of the image, the tone mapping curve that is applied may map the values of pixels in a way that results in some undesirable side effects. For example, contrast present in the original image may be lost, which may reduce detail, especially in high-frequency components of an image. In addition, tone mapping may boost the brightness of a monotonic background of an image, which is undesirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To facilitate preserving contrast of detail in an image and prevent boosting of monotonic regions in the image, the present disclosure provides techniques for implementing and operating a pixel contrast control (PCC) block in a way that avoids these unintended consequences. In an embodiment, to preserve contrast of detail in an image, the pixel contrast control block may preform operations including applying a two-dimensional (2D) low pass filter to the luma portion of the image and transforming the resulting low-frequency components of the luma portion via a tone mapping curve as well as applying a 2D high pass filter to the luma portion of the image and transforming the high frequency components of the luma portion via gain "curve." In an additional or an alternative embodiment, the pixel contrast control block may preform operations including applying the 2D low pass filter to the luma portion of the image and transforming the resulting low-frequency components of the luma portion via a tone mapping curve as well transforming the luma portion of the image via the gain "curve." In an embodiment, to reduce boosting the monotonic regions of an image such as the background region, the pixel contrast control block may perform operations that include multiplying each bin in a histogram of pixel values by its variance. In an additional or an alternative embodiment, to avoid boosting the monotonic regions of an image, the pixel contrast control block may perform operations that include identifying bins with low variance in the histogram of pixel values of the image and shifting the bins with low variance to the next bin position on the right.

BRIEF DESCRIPTION OF THE DRAWINGS

Various aspects of this disclosure may be better understood upon reading the following detailed description and upon reference to the drawings in which:

FIG. 13 is a block diagram outlining a simplified process applying tone mapping in a way that avoids reducing contrast of the fine features of the image, in accordance with an embodiment;

FIG. 14 is a side-by-side comparison of a left image where the local tone mapping was applied without prior application of a low-pass filter and a right image where the local tone mapping was applied after the application of the low pass filter, in accordance with an embodiment;

DETAILED DESCRIPTION OF SPECIFIC EMBODIMENTS

Figure 1:
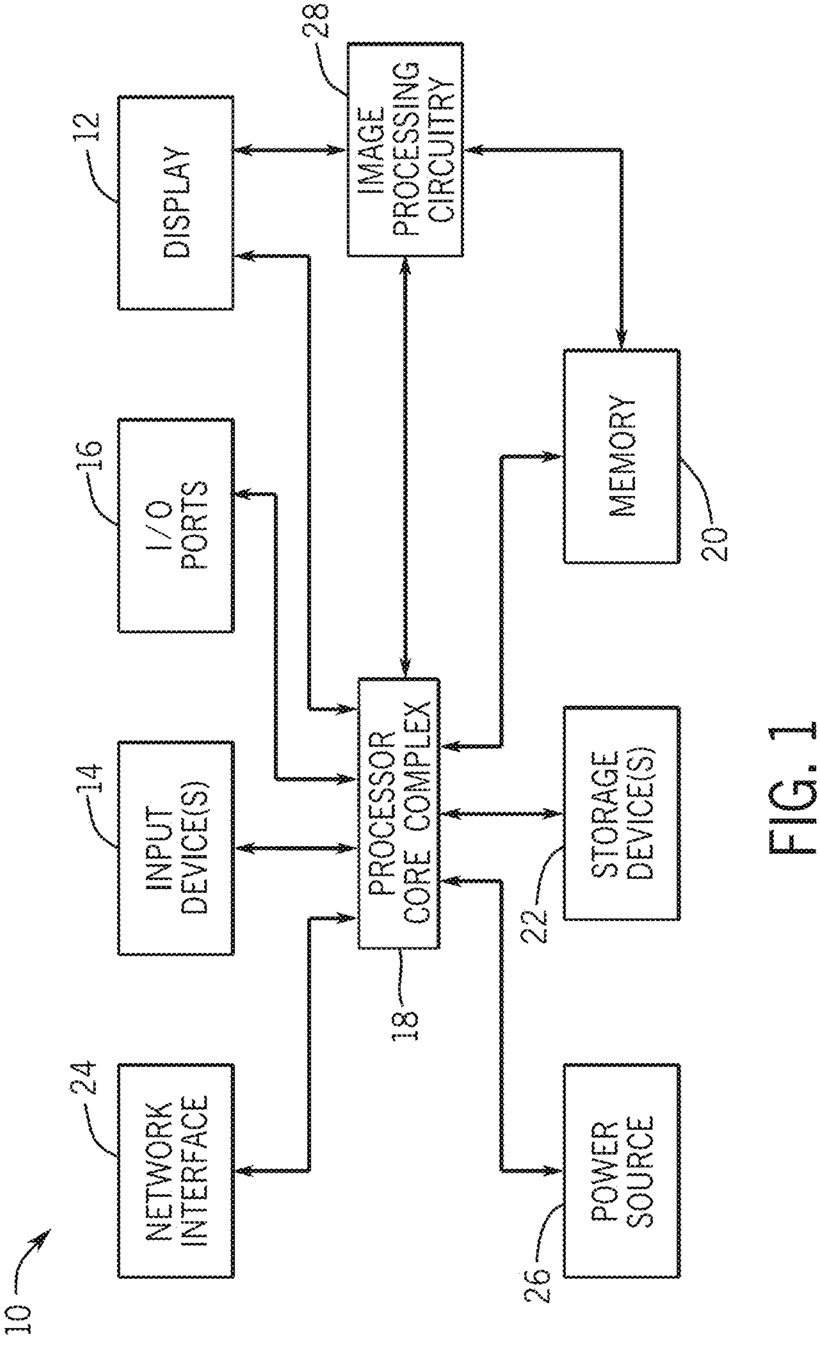
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To facilitate communicating information, electronic devices often use one or more electronic displays to present visual representations of the information via one or more images (e.g., image frames). Generally, to display an image, an electronic display may control light emission (e.g., luminance) of its display pixels based on corresponding image data. For example, an image data source (e.g., memory, an input/output (I/O) port, and/or a communication network) may output image data as a stream of image pixels, which each indicates target luminance of a display pixel located at a corresponding pixel position.

Generally, the luminance of pixels on a display may affect the perceived brightness of a displayed image and, thus, the perceived contrast in an image. At least in some instances, the contrast may affect the perceived quality of a displayed image. For example, a higher contrast may improve edge and/or line sharpness (e.g., definition).

However, the contrast can decrease as ambient lighting conditions change (e.g., increase). To improve the contrast, the luminance of brighter display pixels may be adjusted relative to the luminance of darker display pixels to counteract ambient lighting conditions. For example, if the ambient lighting conditions are bright, the luminance of bright display pixels may be increased. Generally, an electronic display may increase luminance of its display pixels by increasing electrical power supplied to a light source, such a backlight implemented adjacent the display pixels and/or organic light-emitting diodes (OLEDs) of the display pixels. As such, increasing the luminance of the display pixels may also increase power consumption resulting from operation of an electronic display.

To improve perceived image quality and/or reduce power consumption, a pixel contrast control (PCC) block may be implemented and operated in a display pipeline. For example, the pixel contrast control block may be coupled between an image data source and a display panel of an electronic display. In some embodiments, the pixel contrast control block may include processing circuitry (e.g., hardware) that modifies image data to adjust resulting color hue, luminance, and/or luma (e.g., brightness of achromatic portion of an image) in a manner expected to improve contrast. For example, to modify an image pixel, the pixel contrast control processing circuitry may determine a pixel position of the image pixel and apply, to the image pixel, one or more local tone maps associated with the pixel position. When multiple (e.g., four nearest) local tone maps are applied, the pixel contrast control processing circuitry may interpolate the results based on the distance between the pixel position of the image pixel and the pixel positions associated with the local tone maps.

The pixel contrast control processing circuitry may determine pixel statistics, which may be indicative of image content and, thus, used to determine local tone maps. Determining pixel statistics may include determining values (e.g., luma values) of each pixel in an image or a local window and determining a histogram of pixel values of the image or a local window (e.g., a portion of an image frame). For example, based on values of pixels found in the local window, the pixel contrast control processing circuitry may determine a local histogram (e.g., a histogram indicating how many pixels in the local window have each value). Based on the local histogram, a local tone map may be determined.

It may be appreciated that each local window may have a different set of pixels and, therefore, different local pixel statistics and a different local tone maps (e.g., tone mapping curves). While the tone mapping may improve the perceived quality of the image in the local window, depending on the content of the local window (e.g., the local histogram), it may also lead to undesirable side effects. For example, tone mapping could decrease contrast of details (e.g., fine features, high-frequency components) of an image, thereby making the details in the image appear less sharp and less visible. In addition, tone mapping may boost or brighten monotonic regions (e.g., single-color regions of an image where pixels may have a single value or a very small range of values) of an image, which also reduces contrast.

Accordingly, to facilitate preserving contrast of detail in an image and prevent boosting of monotonic regions in the image, the present disclosure provides techniques for implementing and operating a pixel contrast control (PCC) block in a way that avoids these unintended consequences. In an embodiment, to preserve contrast of detail in an image, the pixel contrast control block may preform operations including applying a two-dimensional (2D) low pass filter to the luma portion of the image and transforming the resulting low-frequency components of the luma portion via a tone mapping curve as well as applying a 2D high pass filter to the luma portion of the image and transforming the high frequency components of the luma portion via gain "curve." In an additional or an alternative embodiment, the pixel contrast control block may preform operations including applying the 2D low pass filter to the luma portion of the image and transforming the resulting low-frequency components of the luma portion via a tone mapping curve as well transforming the luma portion of the image via the gain "curve." In an embodiment, to reduce boosting the monotonic regions of an image such as the background region, the pixel contrast control block may perform operations that include multiplying each bin in a histogram of pixel values by its variance. In an additional or an alternative embodiment, to avoid boosting the monotonic regions of an image, the pixel contrast control block may perform operations that include identifying bins with low variance in the histogram of pixel values of the image and shifting the bins with low variance to the next bin position on the right.

Keeping the foregoing in mind, an electronic device 10 including an electronic display 12 (e.g., display device) is shown in FIG. 1. As is described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

The electronic display 12 may be any suitable electronic display. For example, the electronic display 12 may include a self-emissive pixel array having an array of one or more of self-emissive pixels. The electronic display 12 may include any suitable circuitry to drive the self-emissive pixels, including for example row driver and/or column drivers (e.g., display drivers). Each of the self-emissive pixels may include any suitable light emitting element, such as a LED, one example of which is an OLED. However, any other suitable type of pixel, including non-self-emissive pixels (e.g., liquid crystal as used in liquid crystal displays (LCDs), digital micromirror devices (DMD) used in DMD displays) may also be used.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. The image processing circuitry 28 (e.g., a graphics processing unit) may be included in or separate from the processor core complex 18.

The processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable gate arrays (FPGAs), or any combination thereof.

In addition to instructions, the local memory 20 and/or the main memory storage device 22 may store data to be processed by the processor core complex 18. Thus, the local memory 20 and/or the main memory storage device 22 may include one or more tangible, non-transitory, computer-readable mediums. For example, the local memory 20 may include random access memory (RAM) and the main memory storage device 22 may include read-only memory (ROM), rewritable non-volatile memory such as flash memory, hard drives, optical discs, and/or the like.

The network interface 24 may communicate data with another electronic device and/or a network. For example, the network interface 24 (e.g., a radio frequency system) may enable the electronic device 10 to communicatively couple to a personal area network (PAN), such as a Bluetooth network, a local area network (LAN), such as an 1622.11x Wi-Fi network, and/or a wide area network (WAN), such as a 4G or Long-Term Evolution (LTE) cellular network. The power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter. The I/O ports 16 may enable the electronic device 10 to interface with other electronic devices. For example, when a portable storage device is connected, the I/O port 16 may enable the processor core complex 18 to communicate data with the portable storage device. The input device 14 may enable user interaction with the electronic device 10, for example, by receiving user inputs via a button, a keyboard, a mouse, a trackpad, and/or the like. The input device 14 may include touch-sensing components in the electronic display 12. The touch-sensing components may receive user inputs by detecting occurrence and/or position of an object touching the surface of the electronic display 12.

In addition to enabling user inputs, the electronic display 12 may include one or more display panels. Each display panel may be a separate display device or one or more display panels may be combined into a same device. The electronic display 12 may control light emission from the display pixels to present visual representations of information, such as a graphical user interface (GUI) of an operating system, an application interface, a still image, or video content, by displaying frames based on corresponding image data. As depicted, the electronic display 12 is operably coupled to the processor core complex 18 and the image processing circuitry 28. In this manner, the electronic display 12 may display frames based on image data generated by the processor core complex 18 and/or the image processing circuitry 28. Additionally or alternatively, the electronic display 12 may display frames based on image data received via the network interface 24, an input device 14, an I/O port 16, or the like.

Figure 2:
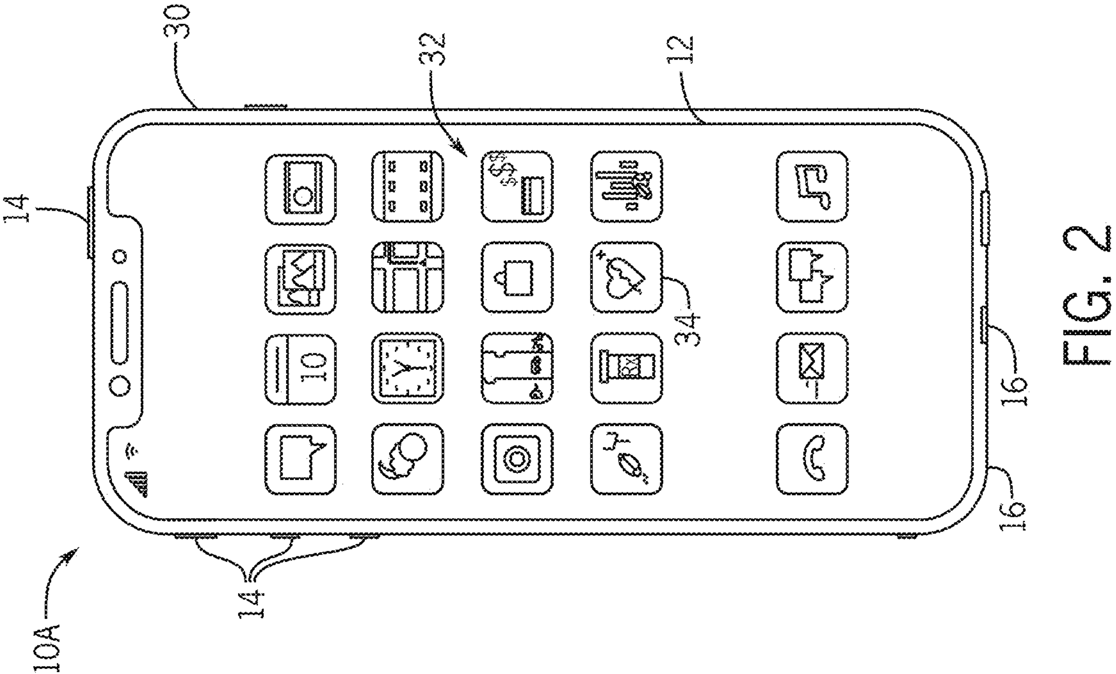
FIG. 2 is an example of the electronic device of FIG. 1, in accordance with an embodiment.

The electronic device 10 may be any suitable electronic device. One example of the electronic device 10, a handheld device 10A, is shown in FIG. 2. The handheld device 10A may be a portable phone, a media player, a personal data organizer, a handheld game platform, and/or the like. For illustrative purposes, the handheld device 10A may be a smart phone, such as any IPHONE® model available from Apple Inc.

The handheld device 10A includes an enclosure 30 (e.g., housing). The enclosure 30 may protect interior components from physical damage and/or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes.

Figure 3:
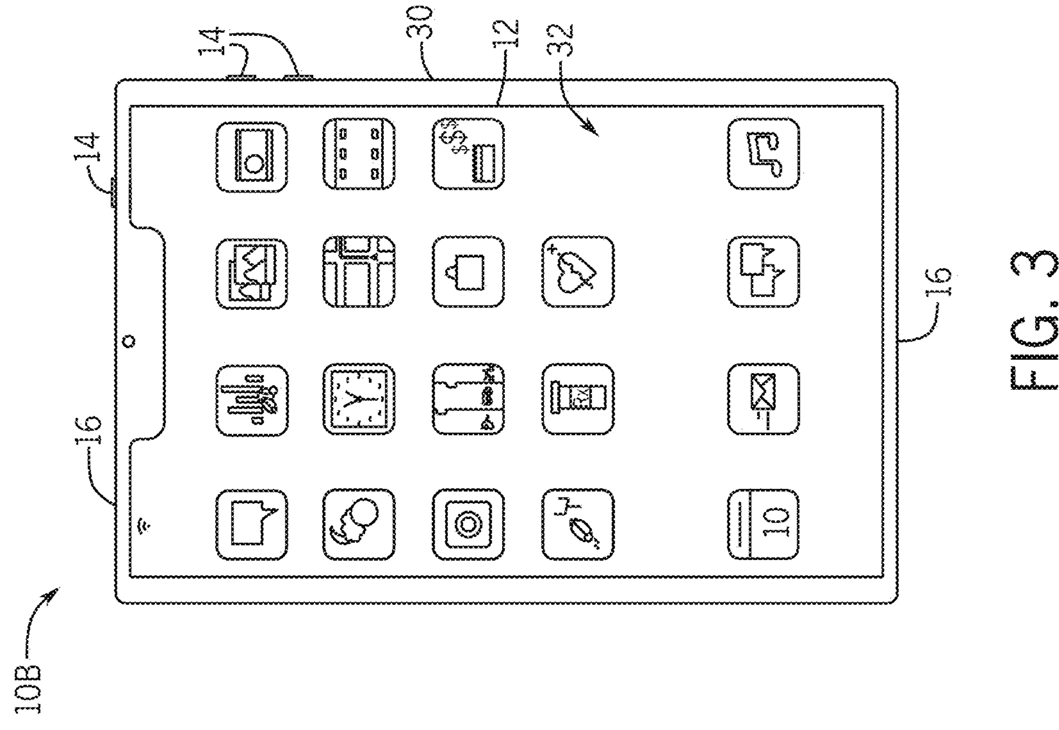
FIG. 3 is another example of the electronic device of FIG. 1, in accordance with an embodiment.
Figure 4:
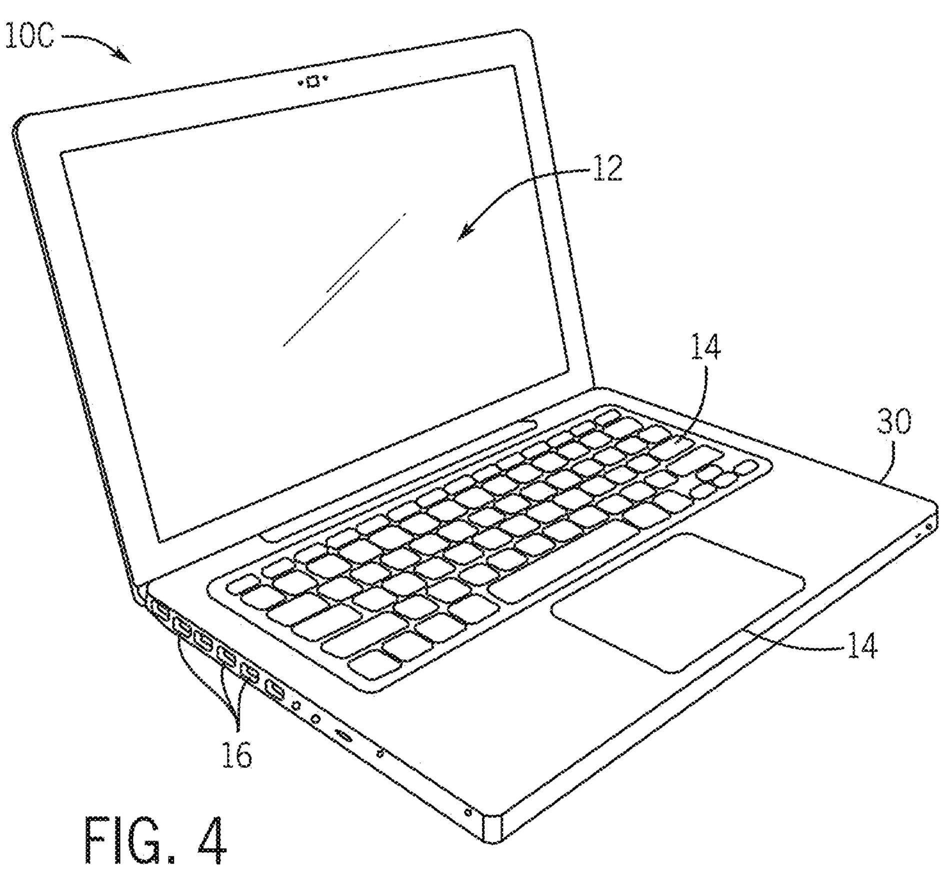
FIG. 4 is another example of the electronic device of FIG. 1, in accordance with an embodiment.
Figure 5:
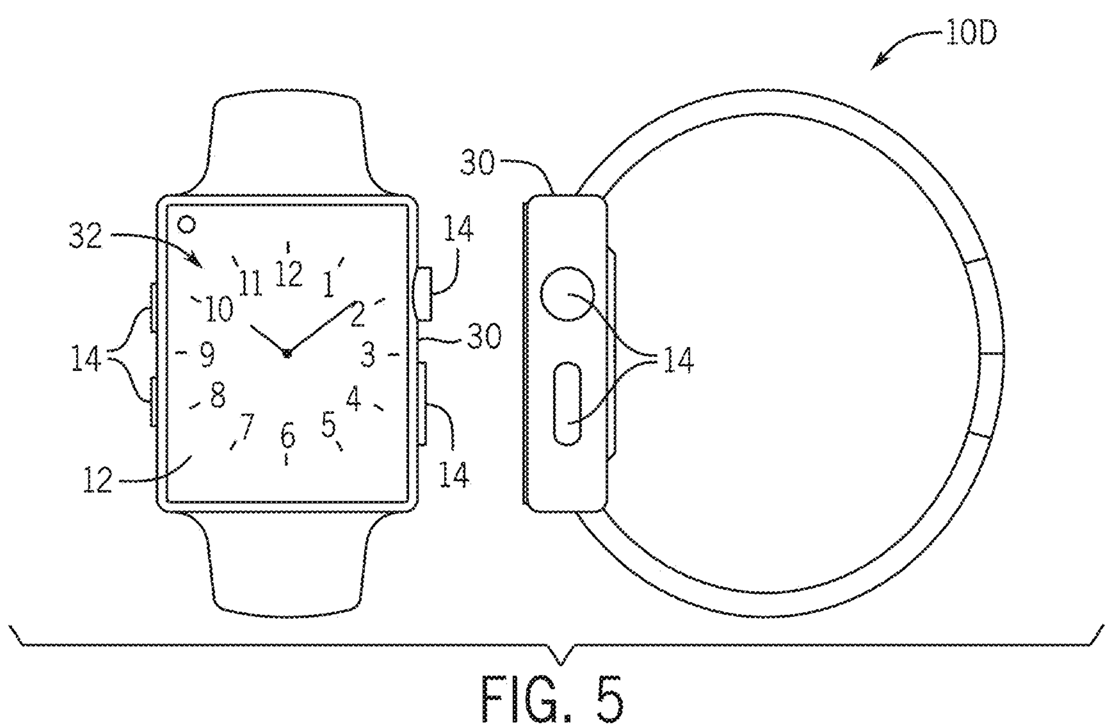
FIG. 5 is another example of the electronic device of FIG. 1, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed with respect to FIGS. 2 and 3.

The electronic device 10 may initially receive encoded image data via image processing circuitry 28 including red, green, blue (RGB) pixel values and alpha values. The alpha values may be used to designate an opacity of each of the pixel values of the image data. The alpha values may contribute to layering within an image, by enabling one or more background layer color pixels to be viewed through one or more top layer color pixels based on the designated image opacity via the pre-multiplied alpha values. By designating, through the use of alpha values, the top layer color pixel values to correspond to some degree of semi-transparency, the background layer color pixels may be viewed through the top layer. Additionally, the alpha values for an image may be set to remove regions of an image and isolate certain portions of images. This may be helpful during augmented reality (AR) image displays and mixed reality (MR) use cases, where one or more images may be layered. Additionally, the RGB values may be pre-multiplied by the alpha values, in which the pre-multiplied alpha values may undergo image processing operations including filtering and blending. The pre-multiplied alpha values may also enable reduction in image artifacts and undergo image processing operations (e.g., scaling) to provide final images with less artifacts to be displayed relative to alpha values that do not undergo scaling and other image processing operations. The image data may include RGB channels (e.g., RGB pixel values for an image), and each RGB channel may be pre-multiplied by the alpha values (e.g., alpha channel) associated with the image to include the pre-multiplied alpha content during image processing operations.

Figure 6:
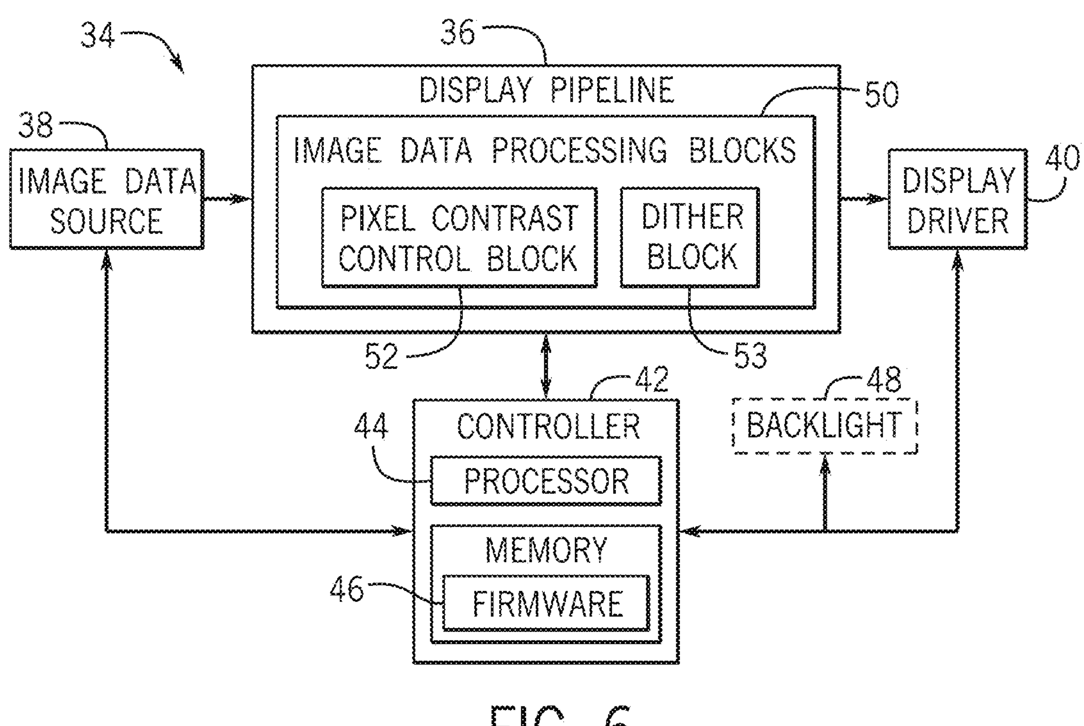
FIG. 6 is a block diagram of a display pipeline coupled between an image data source and a display driver included in the electronic device of FIG. 1, in accordance with an embodiment.

As described above, an electronic display 12 may display images (e.g., image frames) based on image data received, for example, from the processor core complex 18 and/or the image processing circuitry 27. To help illustrate, a portion of the electronic device 10 may include a display pipeline 36 that retrieves, processes, and outputs image data is shown in FIG. 6. In some embodiments, a display pipeline 36 may analyze and/or process image data obtained from an image data source 38 to determine and apply tone curves to the image data before the image data is used to display corresponding images. Additionally, in some embodiments, a display driver 40 may generate and supply signals to the display pixels to display an image based at least in part on image data received from the display pipeline 36.

The display pipeline 36 and/or the display driver 40 may be implemented in the electronic device 10, the electronic display 12, or a combination thereof. For example, the display pipeline 36 may be included in the processor core complex 18, the image processing circuitry 27, a timing controller (TCON) in the electronic display 12, one or more other processing units or circuitry, or any combination thereof. Additionally, a controller 42 may be implemented to synchronize and/or supplement processing of the image data received from the image data source 38. Such a controller may include a processor 44 and/or memory 46, and may be implemented as separate circuitry or integrated into other components. For example, as with the display pipeline 36, the controller 42 may be implemented in the electronic device 10, such as in the processor core complex 18, the image processing circuitry 27, one or more other processing units or circuitry, or any combination thereof.

Image data may be stored in a source buffer in the image data source 38 and fetched by the display pipeline 36. In some instances, an electronic device 10 may include one or more processing pipelines (e.g., display pipeline 36) implemented to process image data. To facilitate communication between processing pipelines, image data may be stored in the image data source 38, external from the processing pipelines. The display pipeline 36 may include a direct memory access (DMA) block that reads (e.g., retrieves) and/or writes (e.g., stores) image data in the image data source 38 (e.g., memory 46, main memory storage device 22, and/or local memory).

The controller 42 and the display driver 40 may also be operatively coupled to a backlight 48, if present in the electronic display 12. In some embodiments, for example such as an electronic devices 10 using a liquid crystal display (LCD), a backlight 48 is included to provide a static or variable light source that acts a light source for the display pixels and, thus, viewing of images. However, self-emissive displays 12 may not use a backlight 48 but instead may include self-emissive pixels (e.g., including organic light emitting diodes (OLEDs) or micro light emitting diodes (μ-LEDs)). Furthermore, some embodiments may include more than one light source, such as self-emissive pixels and a backlight 48.

When retrieved (e.g., fetched) from the image data source 38 by the display pipeline 36, image data may be formatted in the source space. The source space may include file formats and/or coding native to the image data source 38. To facilitate display of corresponding images on an electronic display, the display pipeline 36 may map the image data from the source space to a display space used by the electronic display 12. Different types, models, sizes, and resolution displays may have different display spaces.

Additionally, the display pipeline 36 may include one or more image data processing blocks 50 that perform various image processing operations, for example, to map the image data from the source space to the display space. In the depicted embodiment, the image data processing blocks 50 include a pixel contrast control (PCC) block 52 and a dither block 53. In some embodiments, the image data processing blocks 50 may additionally or alternatively include a color management block, a blend block, a crop block, and/or the like. In some embodiments, a display pipeline 36 may include more, less, combined, split, and/or reordered image data processing blocks 50.

The dither block 53 may assist in smoothing pixel colors and intensities globally and/or locally. These adjustments may assist in compensating for quantization error. For example, a display may not be able to achieve the full color pallet of the image data. Instead of rounding or estimating to the nearest color, the dither block 53 may intertwine colors of the display's color pallet amongst localized pixels to approximate the original image data and provide a more aesthetic, clear, and/or sharp output for viewing. Additionally or alternatively, the dither block 53 may also provide temporal dithering which may alternate colors and/or light intensities on different images to yield an appearance of a targeted (e.g., desired) color.

Based on the characteristics of the display space image data and environmental conditions, such as ambient lighting, the PCC block 52 may analyze image data from the current and/or previous frames and apply local tone maps. In some embodiments, the local tone maps may adjust the color and brightness levels of pixels based on image data characteristics and environmental factors.

Figure 7:
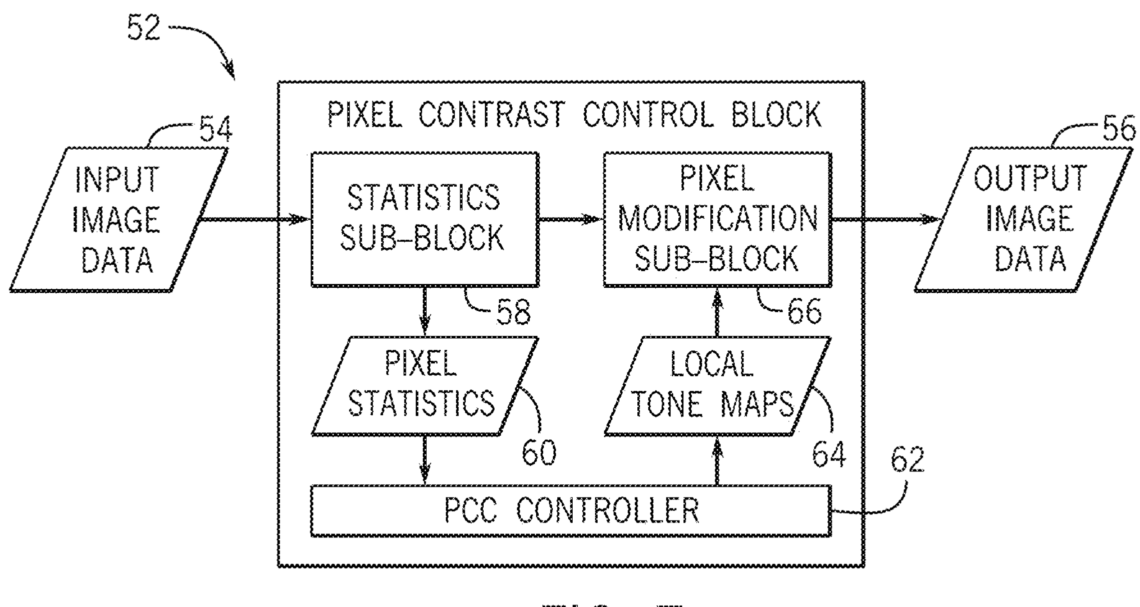
FIG. 7 is a block diagram of a pixel contrast control block included in the display pipeline of FIG. 6, in accordance with an embodiment.

FIG. 7 is a block diagram of the PCC block 52 receiving input image data 54 and producing output image data 56. The input image data 54 of the upcoming frame may be analyzed by a statistics sub-block 58 to obtain pixel statistics 60. These pixel statistics 60 may include minimums, maximums, averages, histograms, and/or other information indicative of content of the input image data 54. Additionally, pixel statistics 60 may be determined globally and/or locally. The pixel statistics 60 may be processed by a PCC controller 62 to determine local tone maps 64 to adjust the input image data 54 in the pixel modification sub-block 66. Output image data 56 may then be further processed and/or sent to the display driver 40.

In some embodiments, the PCC block 52 may be divided into more than one processing sections. For example, the statistics sub-block 58 and the pixel modification sub-block 66 may be implemented by pixel contrast control processing circuitry (e.g., hardware) and the PCC controller 62 may be implemented by a processor that executes instructions (e.g., firmware) stored in a tangible, non-transitory, computer-readable medium. In some embodiments, the PCC controller 62 may include a dedicated processor or microprocessor. Additionally or alternatively, the PCC controller 62 may share processing resources with the controller 42, processor core complex 18, or the like.

In some embodiments, the statistics sub-block 58 may communicate an interrupt signal to the PCC controller 62 when pixel statistics 60 are available for processing. Additionally, after determining the local tone maps 64 (e.g., tone mapping curves, functions or operators that transform input pixel values to output pixel values) based at least in part on the pixel statistics 60, the PCC controller 62 may store the local tone maps 64 in registers accessible by the pixel modification sub-block 66. Additionally, to facilitate synchronization, the PCC controller 62 may indicate to the pixel modification sub-block 66 that the local tone maps 64 have been updated and are ready to be applied.

Figure 8:
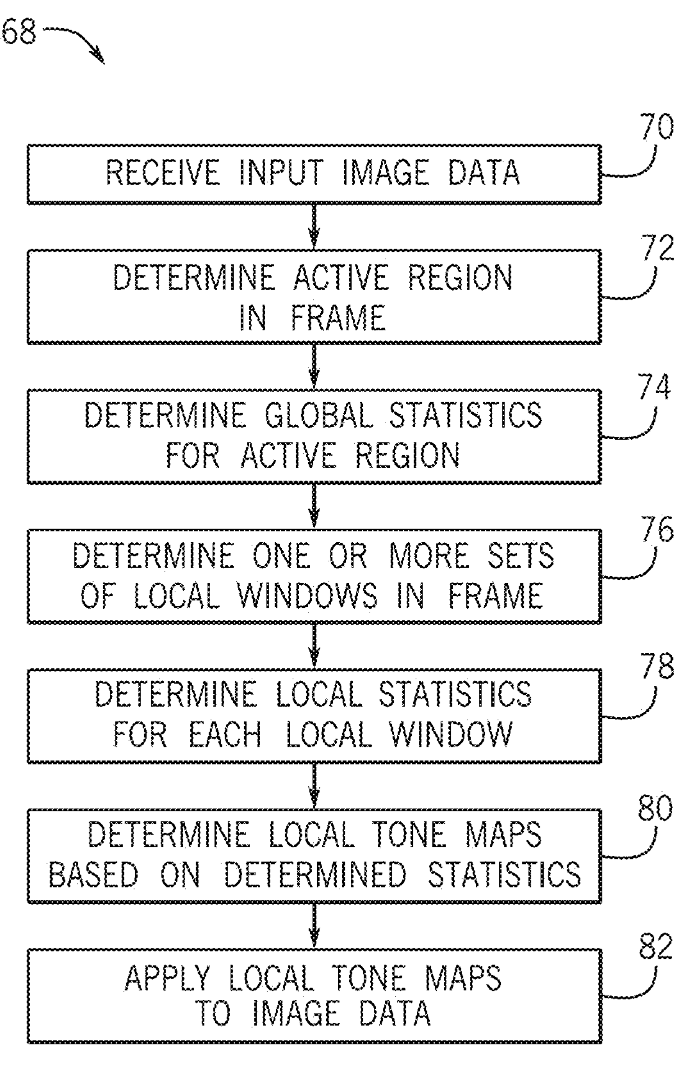
FIG. 8 is a flowchart of a process for operating the pixel contrast control block of FIG. 7, in accordance with an embodiment.

FIG. 8 is a flow diagram 68 illustrating an overview of the operation of the PCC block 52. The PCC block 52 receives input image data 54 for a frame (process block 70) and determines one or more active regions in the frame (process block 72). The active region(s) may be areas of the frame that are going to be considered in controlling perceived contrast. The statistics sub-block 58 of the PCC block 52 may determine global statistics for the active region (process block 74). One or more sets of local windows of the frame may also be determined (process block 76) such that local statistics for each local window may be determined (process block 78). From the global and local statistics, local tone maps 64 may then be determined (process block 80) and applied to the input image data 54 (process block 82).

Figure 9:
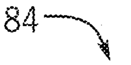
FIG. 9 is a diagrammatic representation of an example image frame, in accordance with an embodiment.
Figure 9:
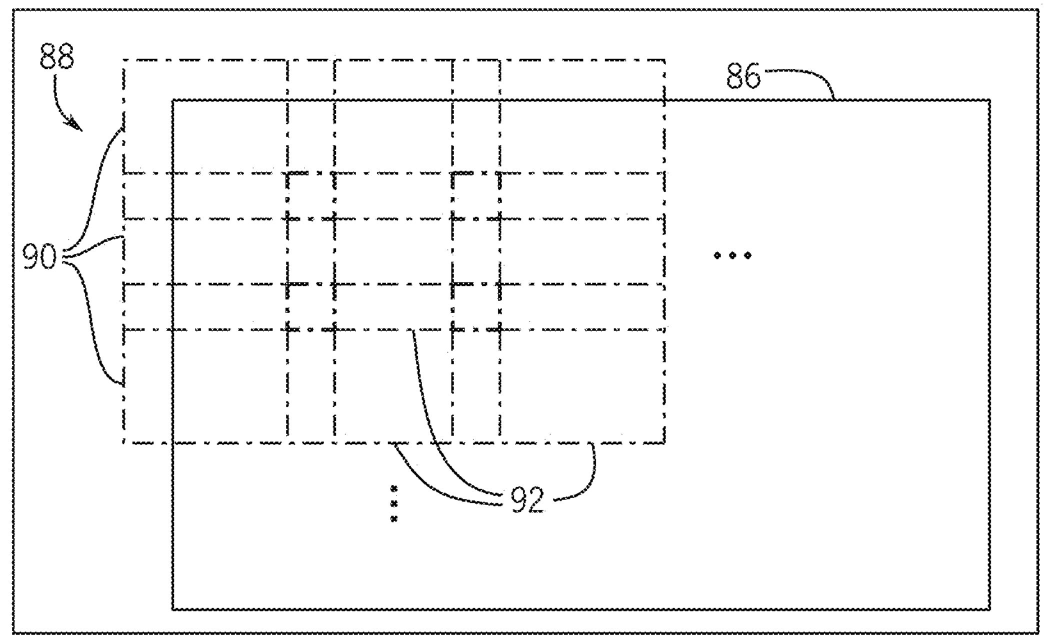

FIG. 9 is an example image frame 84 of the input image data 54 in which an active region 86 is defined. As stated above, the active region 86 may be an area of the image frame 84 that is to include PCC processing separately from the rest of the image frame 84. For example, active regions 86 may exclude or be separated from areas of the image frame 84 that include subtitles, constant color sections (e.g., letterboxes), and/or the like. Additionally, an active region 86 may include a portion of the image frame 84 separated via picture-in-pictures or split-screen. In some embodiments, the active region 86 may include the full image frame 84.

In any case, one or more sets of local windows 88 may be defined based at least in part on the active region 86. For example, a first set (e.g., a first set of local windows 88) may be defined to completely enclose the active region 86. In fact, in some embodiments, the first set may include edge windows 90 that encompass portions of the image frame 84 outside the active region 86. Although pixel statistics 60 are to be drawn from the portion of the edge windows 90 within the active region 86, in some embodiments, pixel statistics 60 may nevertheless be gathered from outside the active region 86. Additionally or alternatively, a second set may be defined such that it is completely enclosed within the active region 86. Additionally, in some embodiments, the local windows 88 included in the second set may differ from the local windows 88 included in the first set, for example, such that they are aligned and/or offset differently. In other embodiments, a single set of local windows 88 may be used.

It may be appreciated that each local window 88 may have a different set of pixels, and therefore, different local pixel statistics and a different local tone map 64. While the tone mapping may generally improve the perceived quality of an image (e.g., a local window 88), depending on the pixel statistics 60 of the image, tone mapping may also lead to appearance of undesirable effects. For example, a local tone map 64 that maps input pixels (e.g., pixels of the input image data 54) from relatively low luma values to relatively high luma values of output pixels (e.g., pixels of the output image data 56), may, in certain cases, decrease the contrast of details of the input image, as illustrated in FIG. 10.

Figure 10:
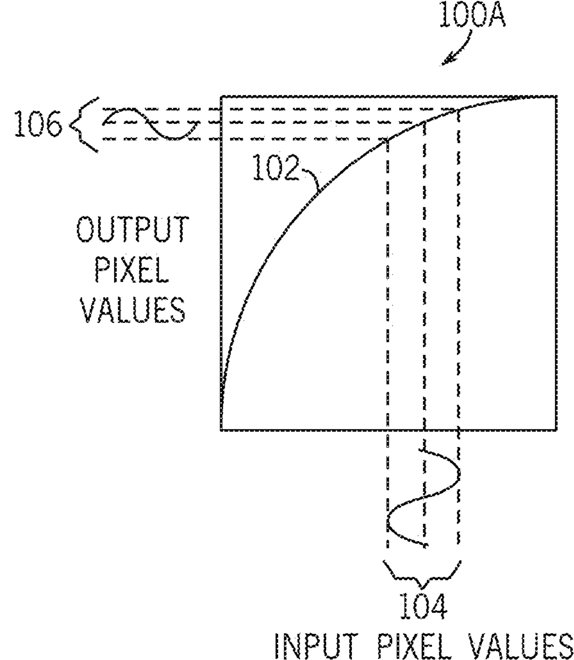
FIG. 10 is a graph of an example of a tone mapping curve that may reduce the contrast of the high frequency components of an image, in accordance with an embodiment.

FIG. 10 is a graph 100A of an example of a tone mapping curve 102 that could undesirably reduce the contrast of the high frequency components of an image. As used here, the image may refer to an input image such as the content of a local window 88. The tone mapping curve 102 is an example of a local tone map 64 that may map the values of input pixels (e.g., values of pixels of an input image), shown on a horizontal axis, to values of output pixels (e.g., values of pixels of an output image), shown on the vertical axis. In an embodiment, the values being mapped may include luma values. As discussed, luma is associated with the monochromatic brightness of the pixels. For example, pixels with low luma values may appear relatively dark and pixels with high luma values may appear relatively bright.

Since most of the points on the tone mapping curve 102 lie above a one-to-one mapping (e.g., mapping where each output value is equal to the corresponding input value), the tone mapping curve 102 may generally map darker input pixels to lighter output pixels. In addition, the tone mapping curve 102 flattens out at high output values. As such, a range of output values may be reduced compared to a corresponding range of input values. To illustrate, values of pixels of an image may fall into a first range 104. The input pixel values in the first range 104 may be mapped by the tone mapping curve 102 to output pixel values in a second range 106. The second range 106 has a smaller difference between the highest value and the lowest value than the first range 104, and therefore, the output image with pixel values in a second range 106, may have lower perceived contrast (herein, also referred to as "contrast"). This may be undesirable, as loss of contrast may make details in the image more difficult to see.

Figure 11:
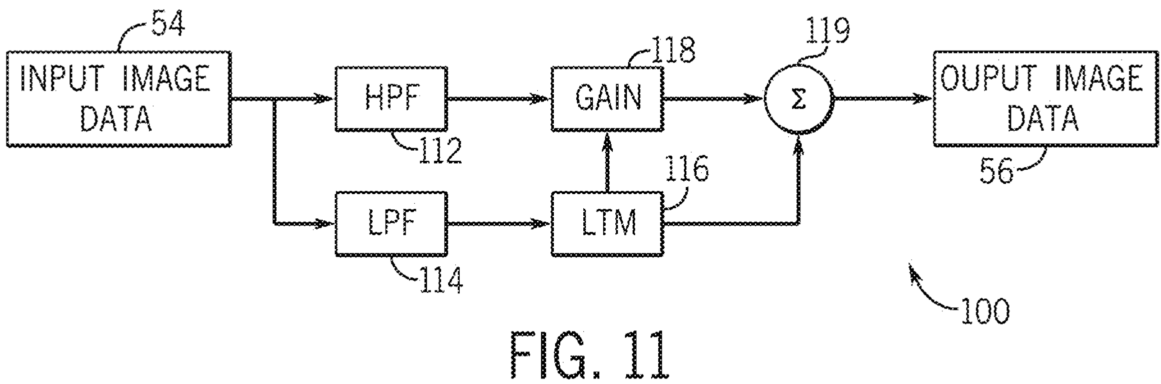
FIG. 11 is a graph of the tone mapping curve of the FIG. 10 and a corresponding gain curve, in accordance with an embodiment.

A solution to the loss of contrast in the fine features of an image due to tone mapping may include applying some or all of the local tone maps 64 only to low frequency components of the image and applying gain to the high frequency components of the image, as shown in FIG. 11. FIG. 11 is a block diagram outlining a process 100 of applying tone mapping to an image in a way that avoids reducing contrast in the fine features of the image. In block 112, a two-dimensional (2D) high pass filter may be applied to the input image data 54 to extract the high frequency components of the input image. In an embodiment, the input image may be a local window 88 and the input image data 54 may include luma values of pixels in the local window 88. For example, the 2D high pass filter may be applied to the luma values of pixels in the local window 88. In block 114, a 2D low pass filter may be applied to the input image data 54 to extract the low frequency components of the input image. Local tone mapping (LTM) may be applied to the low frequency components of the input image (block 116). In an embodiment, the low frequency components and the high frequency components may be processed (e.g., tone mapped) in parallel. As discussed, applying a tone map may include transforming the values of pixels of the image (using a tone mapping curve 102, which may be a non-linear function, as shown in FIG. 10). Since the low frequency components do not reflect the fine features (e.g., detail) of the image, applying the tone mapping to the low frequency components of the image may not negatively affect the contrast of the fine features. On the contrary, applying the tone mapping to the low frequency components of the image may improve the overall appearance of the image and reduce power consumption of the backlight 48, as discussed. In block 118, gain may be applied to the high frequency components of the input image and in block 119 the mapped high frequency components and the mapped low frequency components are added. The output image data 56 includes the sum produced in block 119.

Figure 12:
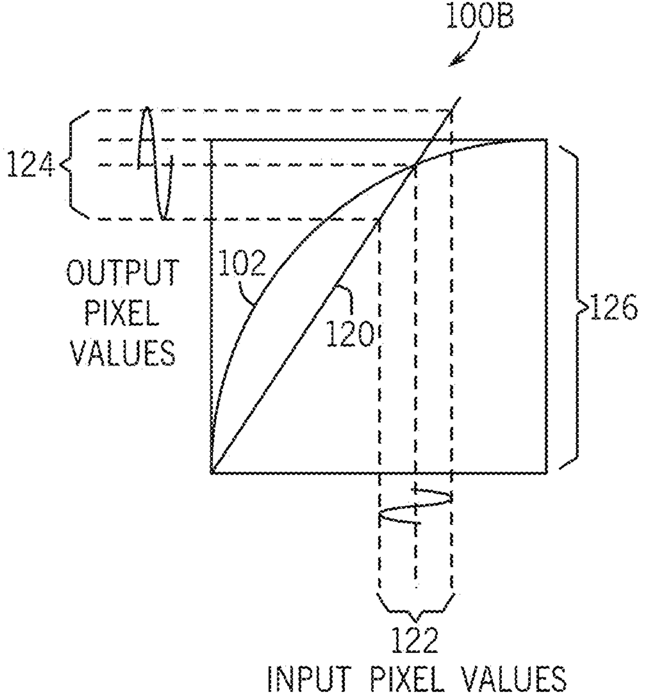
FIG. 12 is a block diagram outlining a process of applying tone mapping in a way that avoids reducing contrast of fine features of an image, in accordance with an embodiment.

Gain is a type of tone mapping that may transform the values of pixels of the image according to a linear function. In other words, applying gain may involve multiplying pixel values by a constant factor. An example of a gain "curve" is shown in FIG. 12. The FIG. 12 is a graph 100B of the tone mapping curve 102 of FIG. 10 and a corresponding gain curve 120. The graph 100B has input values on the horizontal axis and output values on the vertical axis and both the tone mapping curve 102 and the gain curve 120 start at an origin. Both the tone mapping curve 102 and the gain curve 120 map input values of pixels of an image to output values of pixels. However, the gain curve 102 may perform a linear mapping. To illustrate, an input image may have pixel values in an input range 122. Applying gain to the pixel values in the input range 122 (e.g., multiplying the values of pixels by a constant factor) may produce output pixel values in an output range 124. Since the gain curve 120 may typically lie above a one-to-one mapping, the output range 124 may be wider than the input range 122. Thus, contrast in the output image may not be reduced as the difference between the brightest pixel and the darkest pixel of the output image may remain substantial.

In an embodiment, the gain curve 120 may intersect the corresponding tone mapping curve 102. Thus, the slope of the gain curve 120 may depend on the slope of the corresponding tone mapping curve 102. A gain curve 120 and a tone mapping curve 102 may correspond to one another if they map the luminance values of the same image (e.g., same local window). For example, if the values of the low frequency components of an image are mapped with a particular tone mapping curve 102, then the gain curve 120 that is used to map the high frequency components of the same image may intersect the tone mapping curve 102. This may ensure that the corresponding high frequency and low frequency components are mapped to roughly similar values and avoid, for example, the image looking unnatural due to luma values of the high frequency components being low and luma values of the low frequency components being high.

One side effect of applying gain may be that some of the output values may fall outside the range of possible output values 126 (also referred to herein as "possible range 126"), as shown in FIG. 12. In an embodiment, the output values outside the possible range 126 may be clipped (e.g., rounded to the nearest value in the possible range 126). Additionally or alternatively, the tone mapping curve 102 and the gain curve 120 can be adjusted to keep the output values within the range of possible output values 126. For example, the tone mapping curve 102 may be adjusted such that it flattens out at a lower output value. Accordingly, the corresponding adjusted gain curve may have a lower slope (e.g., due to the gain curve 120 intersecting the tone mapping curve 102 at a lower output value) may not produce an overshoot of the output values over the possible range 126. In an embodiment, clipping the output values outside the possible range 126 or adjusting the tone mapping curve 102 and the gain curve 120 may not be needed, as the output image may have headroom for additional high luma values. For example, a high dynamic range display may have the headroom (e.g., capability to display image data with luma outside the standard dynamic range) that may enable to display values outside possible range 126.

In an embodiment, the process 100 applying tone mapping shown in FIG. 11 may be simplified while still preserving contrast of the fine feature of an image. In the simplified process, the gain is applied to the input image data, while the tone mapping is applied to the low frequency components. FIG. 13 is a block diagram outlining a simplified process 130 for applying tone mapping to an image in a way that avoids reducing contrast of the fine features of the image. Generally, the simplified process illustrated in FIG. 13 has the same effect of preserving contrast in the high frequency components as the process illustrated in FIG. 11, but requires less processing. In block 132, a 2D low pass filter is applied to the input image data 54 to select the low frequency components of the input image. In an embodiment, the input image may be a local window 88 and the input image data 54 may include luma values of pixels in the local window 88. For example, the 2D low pass filter may be applied to the luma values of pixels in the local window 88. In block 134, the tone mapping is applied to the low frequency components, which involves transforming the pixel values of the low frequency components with the tone mapping curve, as discussed. In block 136, the pixel values of the input image are multiplied by gain (e.g., slope of the gain curve), and the mapped low frequency components and mapped image data are combined.

It may be appreciated that applying the local tone mapping to the low frequency component of the input image enables preserving contrast in the details of the image. FIG. 14 is a side-by-side comparison of a left image 140 where the local tone mapping was applied without prior application of a low-pass filter and a right image 142 where the local tone mapping was applied after the application of the low pass filter. It may be appreciated that the right image 142 may look more clear and detailed than the left image 140. For example, the faint ridge 144 is sharper in the right image 142 than in the left image 140. FIG. 14 illustrates the improvement in image quality that results from applying the local tone mapping to the low frequency component of the input image as is done in the process 100 and the simplified process 130.

Figure 15:
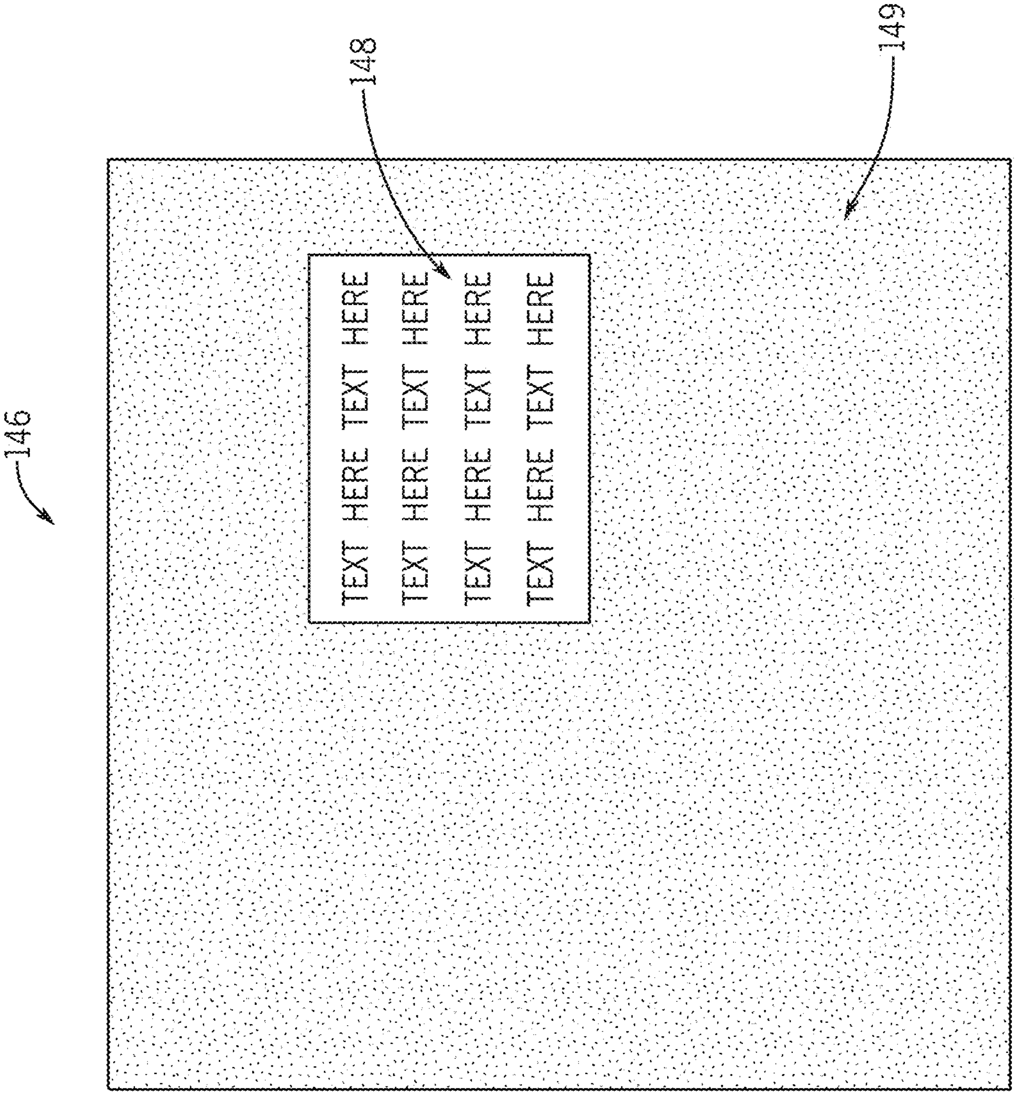
FIG. 15 is an illustration of an image containing a monotonic background and a text box, in accordance with an embodiment.

As discussed, the undesirable effects that may result from tone mapping are not limited to loss of contrast in the details of the image. An additional undesirable effect may include brightening of the monotonic regions (e.g., single-color regions with a single pixel value or a small range of pixel values). To illustrate, consider in an image 146 that contains a text box 148 surrounded by a dark monotonic background 149 shown in FIG. 15. The text box 148 includes text and shading that together may correspond to pixels with several different luma values. The monotonic background 149 surrounding the text box 148 may have a single luma value. As discussed in reference to FIG. 10, a tone mapping curve 102 may generally map lower luma values to higher luma values. Thus, tone mapping may map the values of the monotonic background 149 to higher values thereby making the monotonic background 149 brighter, which may unintentionally take a viewer's attention away from the text box 148 and make the text more difficult to read.

Figure 16:
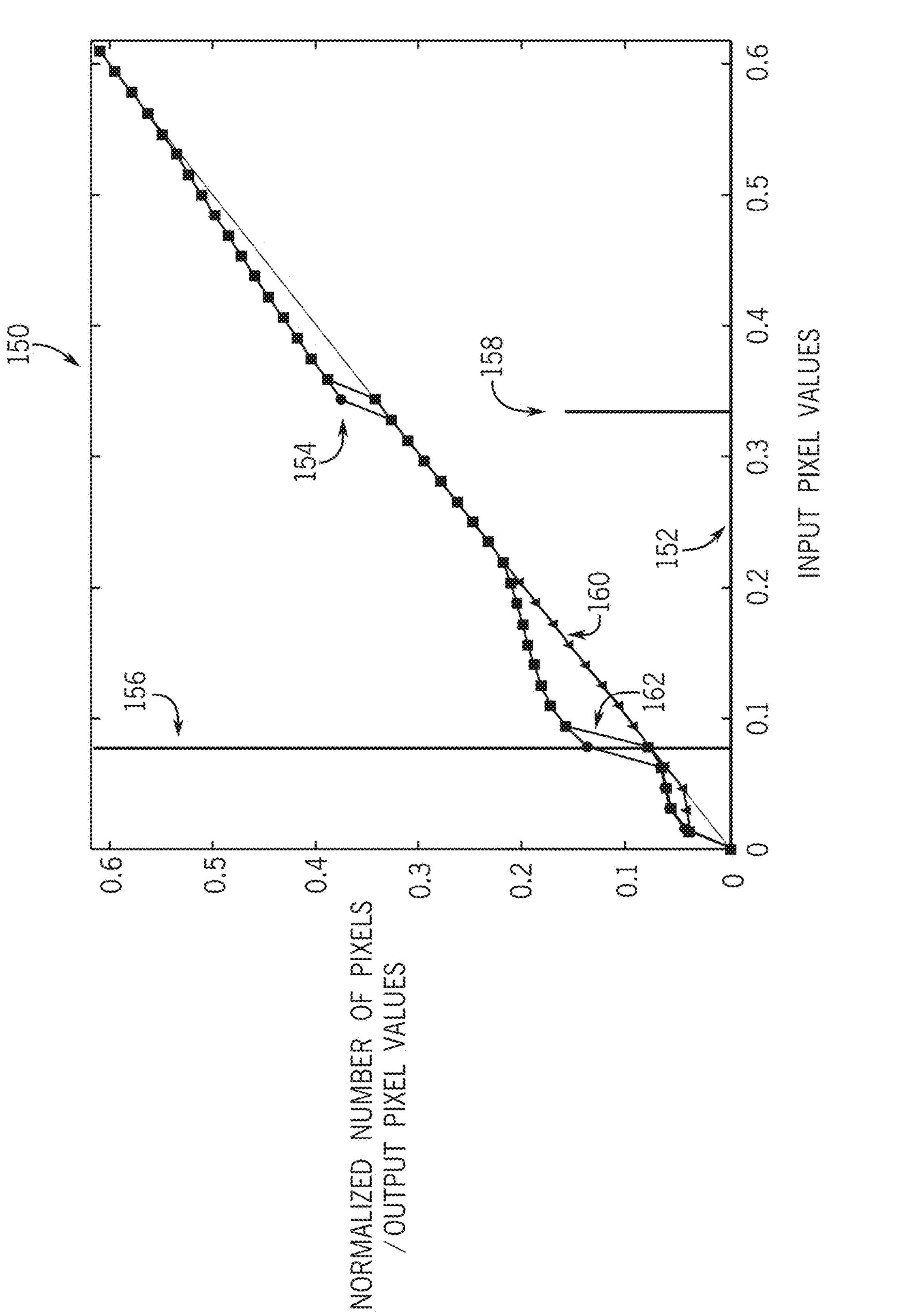
FIG. 16 is a graph of a histogram of the image that contains the text box and the monotonic background, in accordance with an embodiment.

A histogram 152 of the image 146 that contains the monotonic background 149 and the text box 148 is shown in a graph 150 of FIG. 16. The graph 150 also shows a tone mapping curve 154 that corresponds to the histogram. The histogram 152 is shown by a solid line and the tone mapping curve 154 is shown by a line with circular markers. The histogram 152 may include bins of pixel values and indicate how many pixels of the image 146 fall within each bin. A histogram 152 may have bins (e.g., bins with a non-zero number of pixels) corresponding to the monotonic background pixels and bins (e.g., bins with a non-zero number of pixels) corresponding to the pixels inside the text box 148. How many bins correspond to the monotonic background 149 and how many bins correspond to the text box 148 may depend on the overall number of bins in the histogram and the range of values covered by each bin. The histogram 152 has bins representing a relatively wide range of values, and therefore, the histogram 152 has two bins; first bin 156 corresponding to pixels of the monotonic background 149 and second bin 158 corresponding to pixels of the text box 148.

As can be seen in the graph 150, the tone mapping curve 154 rises more around the input pixel values corresponding to the first bin 156 than around the input pixel values corresponding to the second bin 158. This is due to the fact that the larger bins (e.g., bins with more pixels) are given more weight in the determination of the tone mapping curve. As result, pixels in larger bins may be affected more by the tone mapping than pixels with values in smaller bins. Thus, a pixel from the first bin 156 may be brightened (e.g., have its luma value increased) more than a pixel from the second bin 158. This may be undesirable as the pixels in the first bin 156 correspond to the monotonic background 149 of the image 146.

In an embodiment, to prevent boosting (e.g., mapping to higher values, brightening) of the monotonic background 149 by tone mapping, each bin in the histogram 152 may be multiplied by its variance. The variance of a bin may represent a distribution of pixel values in the bin. For example, if the values are distributed uniformly (e.g., there are similar numbers of pixels with different values in a bin), then the bin may have a higher variance. However, if the pixel values are not distributed uniformly in the bin (e.g., there are many pixels with one value and few pixels with other values in the bin), then the bin may have a lower variance. The bin corresponding to the monotonic background 149 may have a lower variance due to having many pixels with a single value, while the bin corresponding to the text box 148 may have a higher variance due to having pixels with several different values (e.g., text box shading and text may have at least two different pixel values). Multiplying the size of each bin in the histogram 152 by its variance may have the effect of reducing the sizes of bins that have a lower variance, such as the bins corresponding the monotonic background 149. This may decrease the weight of bins with low variance in the determination of the tone mapping curve. Since monotonic background 149 of an image 146 may be represented by one or more bin with lower variance, multiplying the size of each bin by its variance may ensure that tone mapping does not brighten the monotonic background 149 or brightens the monotonic background 149 less than it would otherwise have.

A tone modified tone mapping curve 160 that corresponds to a histogram where the size of each bin is multiplied by the variance of each bin is shown as a line with triangular markers. The modified tone mapping curve 160 does not depart from the one-to-one mapping at the input values corresponding to the monotonic background 149, but does increase from the one-to-one mapping at the pixel values corresponding to the text box 148. The shape of the modified tone mapping curve 160 indicates that the mapping transforms the pixel values of the text box 148 but not the monotonic background 149.

In an additional or an alternative embodiment, to prevent the boosting of the monotonic background 149 by tone mapping, certain bins in the histogram 152 may be shifted (e.g., reassigned) to the next bin in the histogram 152. In this embodiment, the bins that may be shifted are bins having a variance. Whether a bin has a low variance may be determined using a quantity $$a(n) = \frac{\mathrm{var}(n) - \mathrm{var}_{min}}{\mathrm{var}_{max} - \mathrm{var}_{max}} \quad (1)$$

where var(n) is the variance of a bin n and $\mathrm{var}_{max}$ and $\mathrm{var}_{min}$ are a maximum variance and a minimum variance of any bin in the histogram 152. Index n may be used to identify a particular bin in the histogram 152. If a(n) is a close to zero, variance of the bin n is close the minimum variance and the bin n may be shifted to the next bin (e.g., bin n+1) in the histogram 152. Shifting the bin n may involve assigning the size of the bin n to the bin n+1 and assigning a size of zero to the bin n. If a(n) is close to 1, variance of the bin n is close to the maximum variance and the bin n may remain unchanged. A threshold may be defined for determining whether the a(n) is close to zero or close to 1. For example, the threshold may be ½. Then, if a(n) for the bin n is below ½, the bin n may be shifted.

Shifting bins with low variance to the next bin position in the histogram 152 may have the effect of adjusting the tone mapping curve 154 such that portions of the tone mapping curve 154 that map input values to higher output values are shifted to the right. An example of such an adjusted tone mapping curve 162 is shown in the graph 150 of the FIG. 16 by a line with square makers. Because the portions of the adjusted tone mapping curve 162 that map input values to higher output values are shifted to the right, the adjusted tone mapping curve 162 may not map the values of bins with low variance to higher values. In addition, because bins with a variance above the threshold may not be shifted, the adjusted tone mapping curve 162 may map other portions (e.g., the text box 148) of the image 146 normally. As result, the adjusted tone mapping curve 162 that corresponds to the adjusted histogram with certain bins shifted to the right may not boost or brighten the monotonic background 149.

Figures 17, 18:
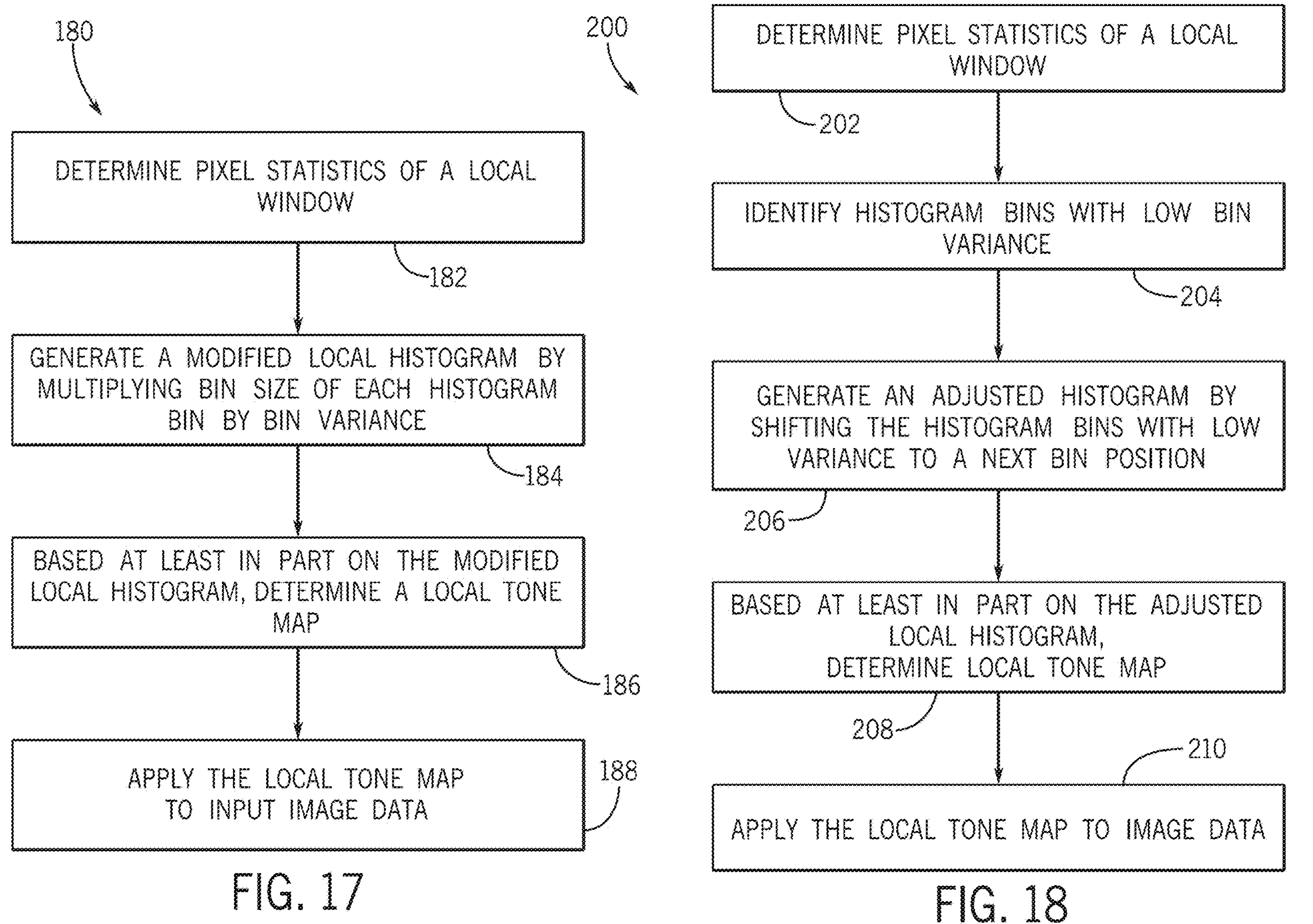
FIG. 17 is a flow diagram of a process of applying tone mapping to an image in a way that preserves contrast of fine features of the image, in accordance with an embodiment.
FIG. 18 is a flow diagram of an alternative process of applying tone mapping to an image in a way that preserves contrast of the fine features of the image, in accordance with an embodiment.

FIG. 17 is a flow diagram of a process 180 of applying tone mapping to an image in a way that preserves contrast of fine features of the image. For example, the process 180 may be applied to the contents of a local window 88. In block 182, the pixel statistics 60 of the image may be determined. The pixel statistics 60 may be determined via the statistics sub-block 58 of the pixel contrast control block 52 and may include a histogram of the values of pixels of the image. In an embodiment, the values may include luma values of the pixels in the image. In an alternative embodiment, the values may include luminance values or other types of values that represent tone or color of pixels. In block 184, a modified histogram may be generated by multiplying the bin size of each bin in the histogram by its variance. For example, the size of the first bin may be multiplied by the variance of the first bin, the size of the second bin may be multiplied by the variance of the second bin, and so forth. In an embodiment, the modified histogram may be normalized such that the sum of the sizes of all the bins in the histogram (e.g., total number of pixels represented by the modified histogram) is equal to 1 or equal to the is equal to the number of pixels in a histogram where the bins have not been multiplied by variance. In block 186, a local tone map 64 (e.g., a tone mapping curve) may be determined via the PCC controller 62 based at least in part on the modified histogram. In block 188, the local tone map is applied to input image data 54. For example, applying the local tone map 64 may include mapping input values of each pixel in the local window 88 to a set of output values. As result of performing the process 180, contrast of the image may generally be improved and the power consumption of the backlight 48 of the display 12 may be reduced without the undesirable effect of brightening of the monotonic regions of the image.

FIG. 18 is a flow diagram of an alternative process 200 of applying tone mapping to an image in a way that preserves contrast of the fine features of the image. For example, the alternative process 200 may be applied to the contents of a local window 88. In block 202, pixel statistics 60 of an image may be determined. The pixel statistics 60 may be determined via the statistics sub-block 58 of the pixel contrast control block 52 and may include a histogram of the values of pixels of the image. In an embodiment, the values may include luma values of the pixels in the image. In an alternative embodiment, the values may include luminance values or other types of values that represent tone or color of pixels. In block 204, histogram bins with low variance may be identified. In an embodiment, pixel statistics sub-block 58 may determine a quantity that on a scale from 0 to 1 indicates how close the variance of a given bin is to the minimum bin variance or a maximum bin variance of all bins in the histogram. If the quantity associated with variance of a particular bin is close to zero or below a particular threshold (e.g., a threshold between 0 and 1), then, the bin may be identified as having low variance. In block 206, an adjusted histogram is generated by shifting the histogram bins identified as having low variance to a next bin position. In an embodiment, shifting a bin with low variance to a next bin position may include assigning a size of the bin with low variance to a next bin on the right and assigning a size of zero to the bin with low variance. In block 208, based at least in part on the adjusted local histogram, a local tone map 64 is determined via the PCC controller 62. In block 210, the local tone map 64 is applied to input image data 54. As discussed, applying the local tone map 64 may include transforming pixel values of the image according to a tone mapping curve via the pixel modification sub-block 66. As result of performing the alternative process 200, contrast of the image (e.g., the image resulting from the process 200) may generally be improved and the power consumption of the backlight 48 of the display 12 may be reduced without the undesirable effect of brightening of the monotonic regions of the image.

It may be appreciated that the tone mapping curve 102 of the FIG. 10 as well as the tone mapping curves 154, 160, and 162 of the FIG. 16 are merely examples of possible tone mapping curves. A tone curve may perform any type of mapping from input pixel values to output pixel values and may not necessarily map lower pixel values to higher pixel values. In addition, the gain curve 120 of the FIG. 12 is an example of a possible gain curve and the histogram 152 of the FIG. 16 is an example of a possible histogram of an image with a monotonic region. FIG. 10, FIG. 12, FIG. 15, and FIG. 16 are presented to aid in understanding of the systems and techniques disclosed above.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:

an electronic display configured to display an image;

a display pipeline comprising pixel contrast control processing circuitry comprising circuitry configured to:

determine pixel statistics indicative of content of the image based at least in part on image data of the image that indicates luma values of each pixel in the image, wherein the pixel statistics comprise a histogram of a frequency of each luma value of pixels of the image;

determine an adjusted histogram by multiplying a size of each bin of a plurality of bins in the histogram by a variance of the bin to adjust a weight of a first number of bins of the plurality of bins corresponding to a monotonic region of the image;

determine an adjusted tone curve based at least in part on the adjusted histogram and the weight of the first number of bins, wherein the adjusted tone curve is configured to map the luma values to adjusted luma values; and determine an output image data based at least in part on the adjusted tone curve, wherein the output image data corresponds to an output image.

2. The electronic device of claim 1, wherein the image and the output image both comprise a first region where the luma values of neighboring pixels are similar and a second region where the luma values of a neighboring pixels vary.

3. The electronic device of claim 2, wherein a difference in the luma values of the first region between the output image and the image is less than the difference in the luma values between the second region of the output image and the image.

4. The electronic device of claim 1, wherein the circuitry of the pixel contrast control processing circuitry is configured to:

determine a tone curve based on the histogram, wherein the tone curve is different from the adjusted tone curve.

5. The electronic device of claim 1, wherein the variance is associated with a distribution of the luma values within the bin of the histogram.

6. The electronic device of claim 1, wherein determining the adjusted histogram comprises normalizing the adjusted histogram so that it represents a number of pixels that is represented by the histogram.

7. One or more tangible, non-transitory, computer-readable media, comprising instructions that cause pixel contrast control processing circuitry of an electronic device to:

determine pixel statistics indicative of content of an image based at least in part on image data that indicates values of each pixel in the image, wherein the pixel statistics comprise a histogram of a frequency of each value of pixels of the image;

determine an adjusted histogram by shifting each bin with low variance of a plurality of bins in the histogram to a next bin position such that each bin with low variance that maps to first output values that are comparatively higher than that of second output values are shifted to the next bin position, and wherein each bin with low variance corresponds to a monotonic region of the image;

determine an adjusted tone curve based at least in part on the adjusted histogram, wherein the adjusted tone curve is configured to map the values to adjusted output values and not map each bin with low variance to the first output values based on the shift; and determine an output image data based at least in part on the adjusted tone curve and on the image data, wherein the output image data corresponds to an output image.

8. The one or more tangible, non-transitory, computer-readable media of claim 7, wherein the instructions cause the processing circuitry to:

determine a variance of each bin of the plurality of bins in the histogram; and identify each bin with low variance of the plurality of bins based on the pixel statistics and a threshold.

9. The one or more tangible, non-transitory, computer-readable media of claim 8, wherein the threshold indicates a proximity to a minimum variance.

10. The one or more tangible, non-transitory, computer-readable media of claim 7, wherein the instructions that cause the processing circuitry to shift each bin with low variance to the next bin position comprise assigning a size of a bin with low variance to a bin in the next bin position and assigning a size of zero to the bin with low variance.

11. The one or more tangible, non-transitory, computer-readable media of claim 7, wherein the instructions that cause the processing circuitry to determine the pixel statistics comprise determining a maximum variance of the plurality of bins in the histogram and a minimum variance of the plurality of bins in the histogram.

12. The one or more tangible, non-transitory, computer-readable media of claim 7, wherein the values comprise luma values, luminance values, or both.

13. The electronic device of claim 1, wherein adjusting the weight of the first number of bins of the plurality of bins comprises decreasing the weight of the first number of bins of the plurality of bins.

* * * * *